(12) United States Patent
Noe et al.

(10) Patent No.: US 7,046,416 B2
(45) Date of Patent: May 16, 2006

(54) POLARIZATION SCRAMBLER AND A METHOD FOR POLARIZATION SCRAMBLING

(75) Inventors: Reinhold Noe, Paderborn (DE); David Sandel, Padeborn (DE)

(73) Assignee: Siemens Aktiengesellschaft, Munich (DE)

( * ) Notice: Subject to any disclaimer, the term of this patent is extended or adjusted under 35 U.S.C. 154(b) by 45 days.

(21) Appl. No.: 10/292,084

(22) Filed: Nov. 12, 2002

(65) Prior Publication Data

US 2003/0138184 A1    Jul. 24, 2003

(30) Foreign Application Priority Data

Nov. 12, 2001 (DE) ................... 101 55 444
May 24, 2002 (DE) ................... 102 23 211

(51) Int. Cl.
*G02F 1/03* (2006.01)
*G02F 1/07* (2006.01)

(52) U.S. Cl. .................. 359/246; 359/281; 359/484; 385/11

(58) Field of Classification Search ............ 359/3, 359/4, 245, 483–497, 246, 281, 900; 385/1, 385/11
See application file for complete search history.

(56) References Cited

U.S. PATENT DOCUMENTS 4,923,290 A  *  5/1990  Brinkmeyer et al. ........ 350/377

OTHER PUBLICATIONS

Heismann, F., Compact Electro-Optic Polarization Scramblers for Optically Amplified Lightwave Systems, Journal of Lightwave Technology, vol. 14, No. 8, Aug. 1996, pp. 1801-1814.*

Noé, R. et al, "150fs Online PMD Detection Within 5μs", http:ont/upb.de.

Noé, R. et al, "Depolariser based on acousto-optical TE-TM converters for suppression of polarization holeburning in long haul EDFA links", Electronic Letters, vol. 30 No. 18. (Sep. 1, 1994).

* cited by examiner

*Primary Examiner*—Leonidas Boutsikaris
(74) *Attorney, Agent, or Firm*—Bell, Boyd & Lloyd LLC

(57) ABSTRACT

A polarization scrambler and associated method for polarization scrambling are provided, wherein light is passed through a retarder whose eigen modes and delay vary with time and which is driven with alternating signals at two harmonic frequencies. One exemplary embodiment with an electrooptical wave plate operates with a horizontal or vertical input polarization and supplies output polarizations which vary with time and have uncorrelated normalized Stokes parameters. The polarization scrambler which is produced can be used in devices for detection of polarization mode dispersion.

30 Claims, 6 Drawing Sheets

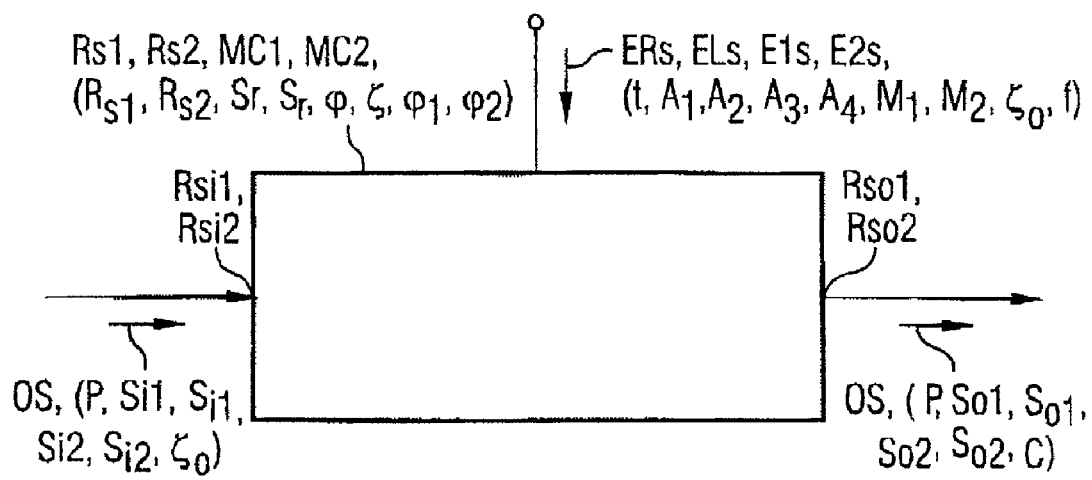
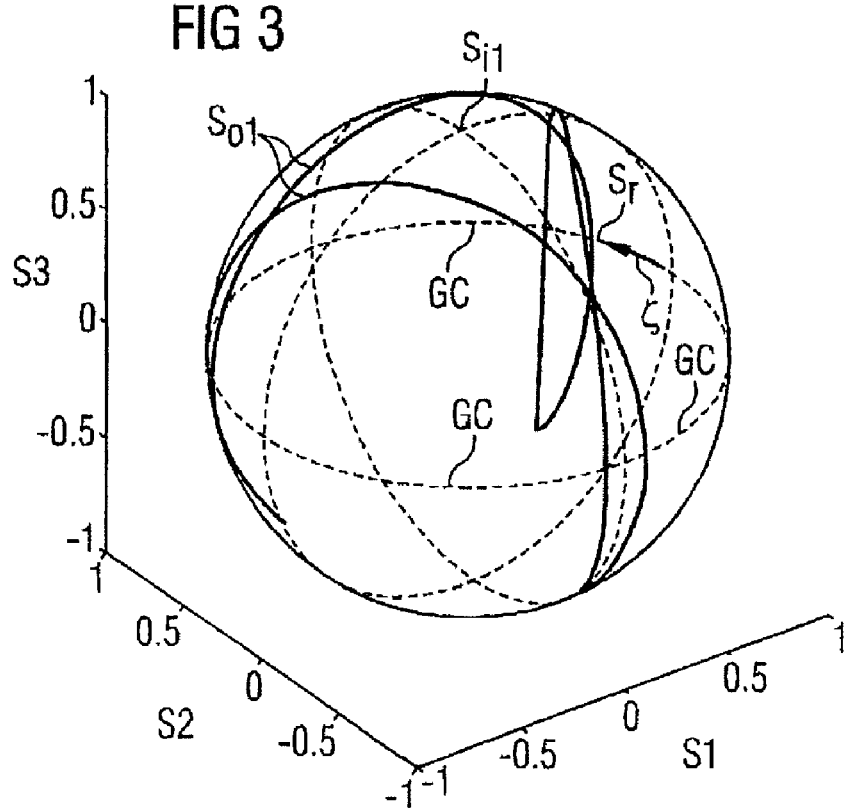

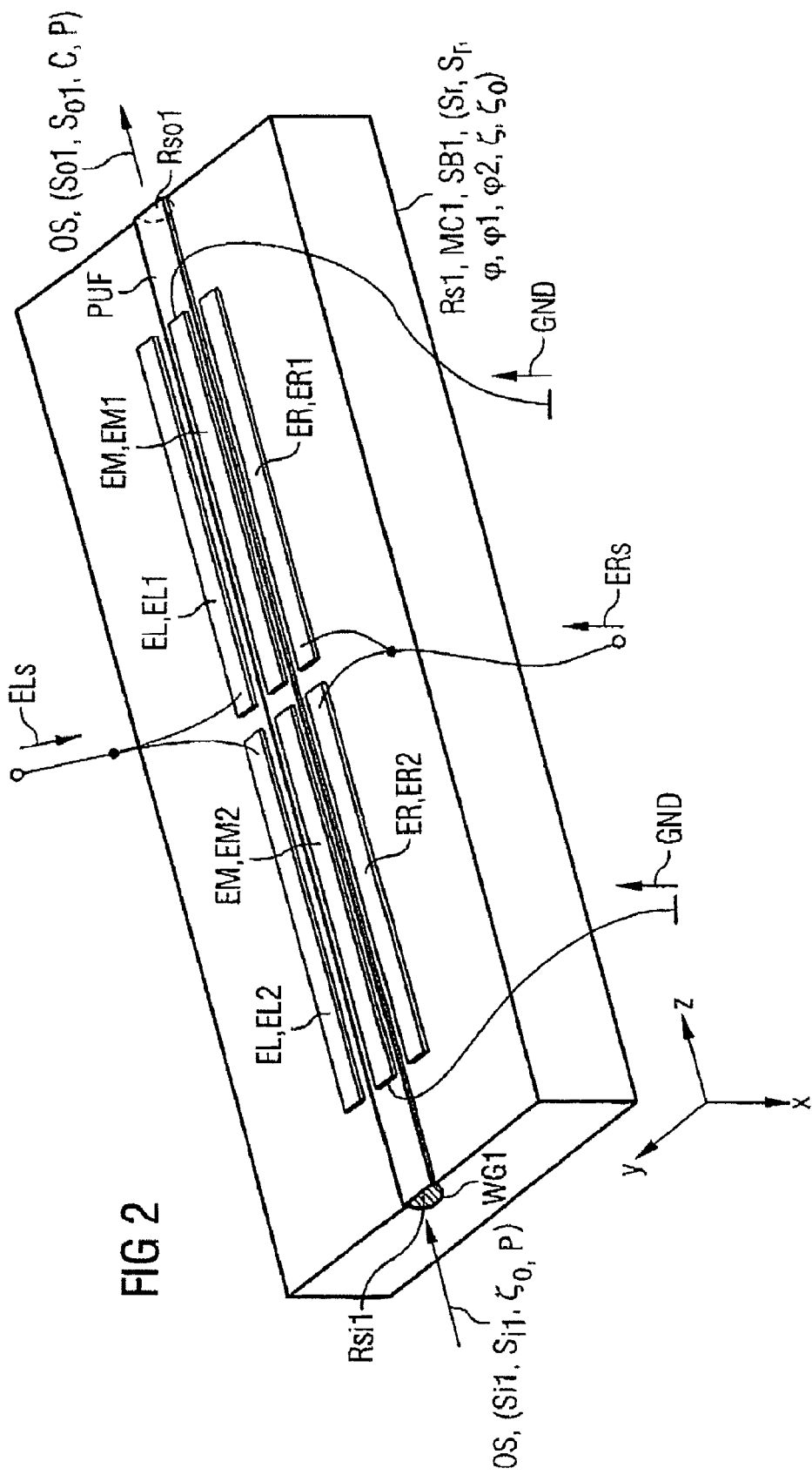

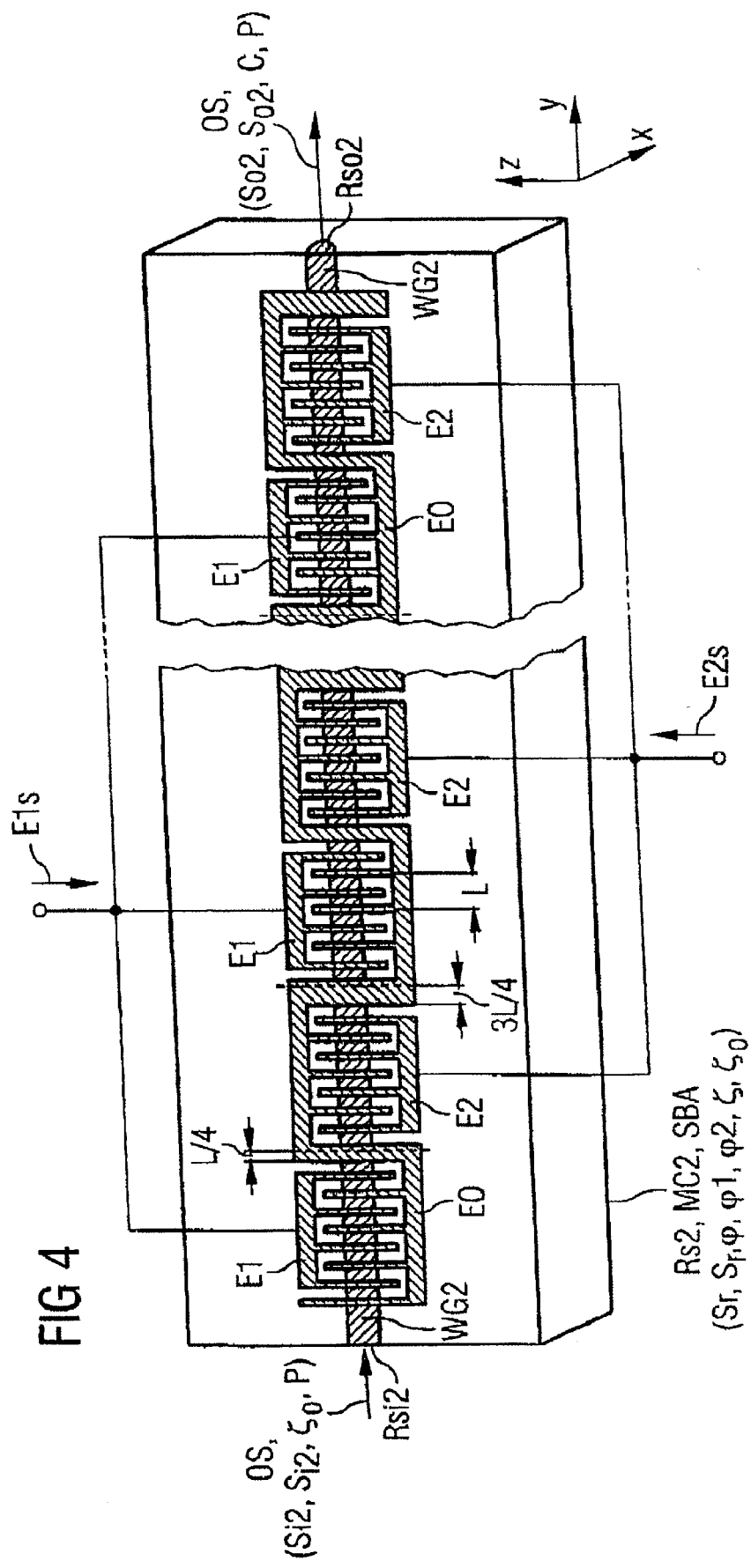

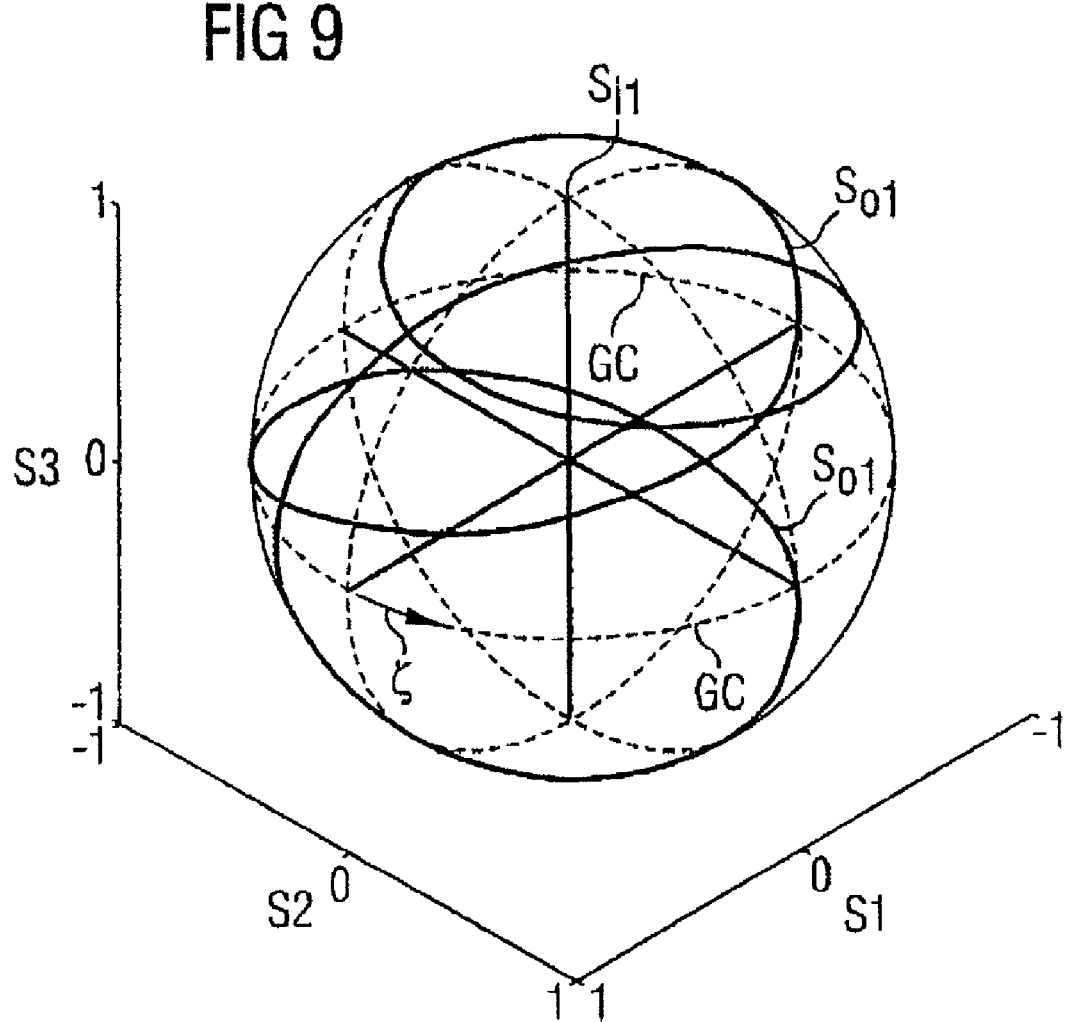

POLARIZATION SCRAMBLER AND A METHOD FOR POLARIZATION SCRAMBLING

BACKGROUND OF THE INVENTION

Polarization mode dispersion, referred to as PMD, adversely affects high-speed optical data transmission. A method for measurement of polarization mode dispersion has been described in the Conference Proceedings of the European Conference on Optical Communication, Amsterdam, NL, Sep. 30–Oct. 4, 2001, Tu.A.3.4, in which a polarization scrambler is used which can produce a large number of output polarizations, or all possible output polarizations, from a specific input polarization. The output polarizations which can be produced define a three-dimensional, not just two-dimensional, figure within the Poincaré sphere. Further polarization scramblers are described in Electronics Letters, Volume 30 (1994)18, pages 1500–1501. These can produce a depolarized output signal from any given input polarization. At least for certain input polarizations, the output polarizations which are produced define, however, only a two-dimensional, and not a three-dimensional, figure within the Poincaré sphere since depolarization is a necessary but not necessarily sufficient precondition for output polarizations actually being produced which define a three-dimensional figure, and not just a two-dimensional figure, within the Poincaré sphere.

Ideally, the output polarizations which are produced should be uncorrelated; that is to say, the correlation matrix of the normalized Stokes vectors of the output polarization should be equal to ⅓ times the 3×3 unit matrix.

The polarization scrambler should be designed to be as simple as possible and to scramble the polarization within a time which is as small a multiple as possible of the cycle duration of the highest frequency oscillation which is required to drive the polarization scrambler.

An object of the present invention is to specify a polarization scrambler which is as simple as possible but is still ideal, as well as an associated method for polarization scrambling, which emits uncorrelated output polarizations.

SUMMARY OF THE INVENTION

A solution to the problem involves the polarization scrambler being in the form of a retarder with variable eigen modes and a variable delay. Polarization scramblers having eigen modes which can be varied on a great circle of the Poincaré sphere are particularly advantageous.

In one exemplary embodiment of the present invention, this polarization scrambler is formed by an electrooptical wave plate. The control electrodes are preferably provided with sinusoidal signals at a fundamental frequency and at the second harmonic of this fundamental frequency. In this way, the polarization is scrambled within a time which is only twice the cycle duration of the highest frequency oscillation which is required to drive the polarization scrambler. In a further exemplary embodiment of the present invention, the polarization scrambler is provided by a mode converter with mode conversion which can be varied freely in phase and in quadrature. In a further exemplary embodiment of the present invention, an electrooptical wave plate is used with horizontal or vertical input polarization.

Additional features and advantages of the present invention are described in, and will be apparent from, the following Detailed Description of the Invention and the Figures.

BRIEF DESCRIPTION OF THE FIGURES

FIG. 1 shows a polarization scrambler according to the present invention.

FIG. 2 shows an exemplary embodiment of a polarization scrambler according to the present invention.

FIG. 3 shows a locus curve of an output polarization on the Poincaré sphere.

FIG. 4 shows a further exemplary embodiment of a polarization scrambler according to the present invention.

FIG. 9 shows a further locus curve of an output polarization on the Poincaré sphere.

DETAILED DESCRIPTION OF THE INVENTION

Figure 5:
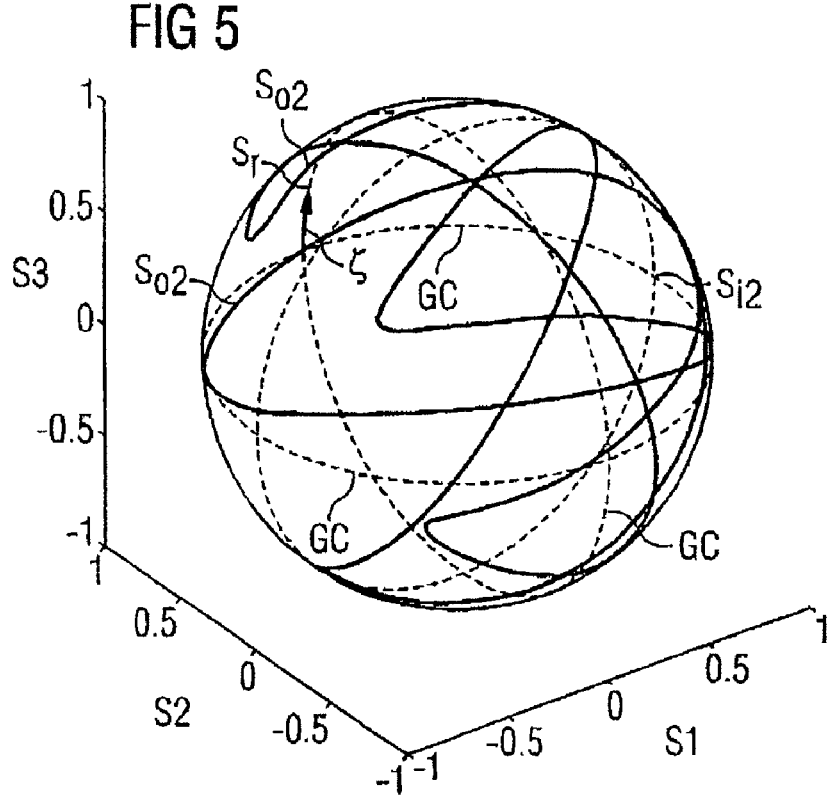
FIG. 5 shows a further locus curve of an output polarization on the Poincaré sphere.

Without any restriction to generality, the following text regards all retarders as being loss-free, although the principle according to the present invention is also applicable to lossy retarders. Retarders each have a pair of mutually orthogonally polarized eigen modes. To assist understanding, one of the two eigen modes is, in each case, referred to as the reference eigen mode in the following text. It is sufficient to quote the reference eigen mode instead of both eigen modes, since the other eigen mode is simply the polarization orthogonal to it. Any other eigen mode is subject to a phase delay in the retarder which is greater by the so-called delay of the retarder than that of the reference eigen mode, which is normally identified or defined by this statement as the reference eigen mode. It is sufficient to consider delays in the main interval, $\pi \ldots \pi$ since the effect of two delays which differ by an integer multiple of $2\pi$ is identical.

It is even possible to go one step further and to consider only positive values in the interval $0 \ldots \pi$ as delays. This is because negative values can be replaced by positive values by interchanging the two eigen modes with one another.

Retarders are described in the following text on the basis of 3×3 submatrices of the Müller matrices of retarders, which have rows and columns 1 to 3 which can be associated with the Stokes vector components 1 to 3 using the numbering running from 0 to 3 for rows and columns in the Müller matrices and for non-normalized Stokes vector components. The 3×3 submatrices accordingly have determinants whose magnitude is 1 or −1 and describe rotations, or mirror-image rotations, in the space of the normalized Stokes vectors. For the sake of simplicity, these are combined by the term rotation matrices in the following text. Normalized Stokes vectors are used to describe the input and output polarizations of retarders.

In an arrangement according to the present invention, for polarization scrambling as shown in FIG. 1, a first or second polarization scrambler Rs1, Rs2 is supplied with an optical signal OS at a first or second input Rsi1, Rsi2, respectively, with a first or second input polarization Si1, Si2 as the polarization P. The polarization P of the optical signal OS is modulated as a function of time t in the polarization scrambler Rs1, Rs2. To do this, it is driven by at least one preferably electrical control signal ERs, ELs, E1s, E2s. The optical signal OS emerges from the polarization scrambler Rs1, Rs2 with a first or second output polarization So1, So2, respectively, as the polarization P at a respective first or second output Rso1, Rso2.

Here and in the following text, designations such as $R_g$, which are equivalent to designations for previously introduced polarization scramblers or retarders such as Rg, but with subscript suffices such as $_q$, may denote the associated rotation matrices. Designations such as $S_{i1}$, $S_{o1}$, $S_{i2}$, $S_{o2}$, which are equivalent to designations for previously introduced polarizations such as Si1, So1, Si2, So2, but with subscript suffices such as $_{i1}$, $_{o1}$, $_{i2}$, $_{o2}$, likewise may denote the associated normalized Stokes vectors.

The normalized Stokes vector $S_{o1}$, $S_{o2}$ of the first or second output polarization So1, So2, respectively, of the first or second polarization scrambler Rs1, Rs2, respectively, according to the present invention has a respective correlation matrix $$C = \langle S_{o1} \cdot S_{o1}^T \rangle \text{ or } C = \langle S_{o2} \cdot S_{o2}^T \rangle,$$

which is produced by averaging the respective product $S_{o1} \cdot S_{o1}^T$ or $S_{o2} \cdot S_{o2}^T$ of the corresponding normalized Stokes vector $S_{o1}$, $S_{o2}$ times its transposition $S_{o1}^T$, $S_{o2}^T$ over time t. The correlation matrix C is at least approximately equal to ⅓ times the 3×3 unit matrix 1, C=(⅓)*1. Its eigen values are accordingly all equal to ⅓. The polarization scrambling thus can be regarded as being of higher quality the larger the smallest eigen value of the correlation matrix C is. Since a loss of, for example, 40% in comparison to the ideal value of ⅓ of this smallest eigen value still may be regarded as being acceptable without any problems, the requirement C=(⅓)*1 may be satisfied only roughly in practice. Corresponding polarization scramblers can be regarded as relatively poor but reliable exemplary embodiments of the present invention.

The polarization scrambler Rs1, Rs2 has a reference eigen mode Sr and a delay φ which, according to the present invention, vary with time; that is to say, they are dependent on the time t.

A general retarder Rg has the general rotation matrix $$R_g = R_g(\varphi_g, S_{rg})$$

$$= \begin{bmatrix} S_{rg1}^2 + (S_{rg2}^2 + S_{rg3}^2)\cos\varphi_g & S_{rg1}S_{rg2}(1-\cos\varphi_g) - S_{rg3}\sin\varphi_g & S_{rg1}S_{rg3}(1-\cos\varphi_g) + S_{rg2}\sin\varphi_g \\ S_{rg1}S_{rg2}(1-\cos\varphi_g) + S_{rg3}\sin\varphi_g & S_{rg2}^2 + (S_{rg1}^2 + S_{rg3}^2)\cos\varphi_g & S_{rg2}S_{rg3}(1-\cos\varphi_g) - S_{rg1}\sin\varphi_g \\ S_{rg1}S_{rg3}(1-\cos\varphi_g) - S_{rg2}\sin\varphi_g & S_{rg2}S_{rg3}(1-\cos\varphi_g) + S_{rg1}\sin\varphi_g & S_{rg3}^2 + (S_{rg1}^2 + S_{rg2}^2)\cos\varphi_g \end{bmatrix},$$

which here, without any restriction to generality, has a positive determinant +1. Its general reference eigen mode Srg is given by the normalized Stokes vector $$S_{rg} = [S_{rg1} \ S_{rg2} \ S_{rg3}]^T = \begin{bmatrix} S_{rg1} \\ S_{rg2} \\ S_{rg3} \end{bmatrix}$$

and its general delay is $\Phi_g$. For comparison: its Jones matrix is $$\begin{bmatrix} \cos\varphi_g/2 + jS_{rg1}\sin\varphi_g/2 & j(S_{rg2} + jS_{rg3})\sin\varphi_g/2 \\ j(S_{rg2} - jS_{rg3})\sin\varphi_g/2 & \cos\varphi_g/2 - jS_{rg1}\sin\varphi_g/2 \end{bmatrix}$$

and the general reference eigen mode Srg is also given by the Jones vector $$\frac{1}{\sqrt{2(1+S_{rg1})}} \begin{bmatrix} 1+S_{rg1} \\ S_{rg2} - jS_{rg3} \end{bmatrix}.$$

It is advantageous for the first and second polarization scramblers Rs1, Rs2 to be provided by a respective first and second mode converter MC1, MC2 with a variable delay φ and with a variable orientation angle ζ. In this case, the orientation ζ is the phase difference between the converted signals and the non-converted signals. The mode converter MC1, MC2 can convert a polarization irrespective of its orientation angle ζ to its orthogonal, provided that its delay φ is equal to π. As such, the normalized Stokes vector $S_r$ of the reference eigen mode Sr can be chosen on a great circle, which is referred to as the eigen mode great circle GC in the following text, on the Poincaré sphere. This eigen mode great circle GC is assumed to be subdivided by the orientation angle ζ at the angle interval 0 . . . 2π.

The first mode converter MC1, formed in this way, is illustrated in FIG. 2 as the first polarization scrambler Rs1. This is in the form of a Soleil-Babinet compensator SBC, to be precise based on an electrooptical Soleil-Babinet compensator using $LiNbO_3$ with an X cut and a propagation direction which is at least approximately the Z direction. Compensators such as these are known from IEEE J. Lightwave Techn. 6(1988)7, pages 1199–1207. The Soleil-Babinet compensator has a first waveguide WG1, which is produced by titanium diffusion and passes through the entire $LiNbO_3$ crystal from the first input Rsi1 to the first output Rso1. The optical signal OS is passed through it. A center electrode EM runs above and along the first waveguide WG1. A buffer layer PUF, composed of $SiO_2$, by way of example, can be fitted between the first waveguide WG1 and the center electrode EM. A side electrode ER, EL is provided on each of the two sides of the center electrode. The center electrode EM and the side electrode ER, EL also may be subdivided longitudinally along the first waveguide WG1 into, in each case, two or more sections EM1, EM2, ER1, ER2, EL1, EL2, which are driven by somewhat different voltages in order to compensate for any circular birefringence which may be present in the first waveguide WG1. The cross section of the X-Y plane is preferably symmetrical with respect to a Z axis running through the center of the first waveguide WG1. An electrical field produced on its own between the two side electrodes ER, EL, with the potential GND on the center electrode EM preferably being the mean value of the potentials ERs, ELs on the two side electrodes ER, EL, produces a first partial delay $\Phi_1$. In this case, the potentials ERs, ELs on the two side electrodes ER, EL are respectively a first and a second control signal ERs, ELs. The reference eigen mode Sr is, in this case, a horizontal (or vertical) polarization, corresponding to an orientation angle $\zeta=0$. An electrical field which is present on its own on the center electrode EM, with the potentials of the two side electrodes ERs, ELs preferably being identical and not being the same as the potential GND on the center electrode EM, produces a second partial delay $\phi_2$. The reference eigen mode Sr is, in this case, a linear polarization with an angle of elevation of +45° (or −45°), corresponding to an orientation angle $\zeta=\pi/2$. Combination of these two cases allows any desired delay $\Phi$ and any desired linear polarized reference eigen mode Sr to be produced. In this case, the delay $\Phi$ is equal to $\phi=\sqrt{\phi_1^2+\phi_2^2}$ and the orientation angle $\zeta$ is equal to $\zeta=\arg(\phi_1+j\phi_2)$, as twice the physical elevation angle of the reference polarization. As shown in FIG. 3, the orientation angle $\zeta$, plotted along the equator of the Poincaré sphere, for example from the positive S1 axis in the direction of the positive S2 axis, thus can be regarded as a point on the S1-S2 great circle on the Poincaré sphere (the great circle which lies on the S1-S2 plane) as the eigen mode great circle GC or the locus of the normalized Stokes vector $S_r$ of the reference eigen mode Sr. The normalized Stokes vector $S_r$ of the reference eigen mode Sr is, in this case, $S_r=[\cos\zeta \sin\zeta 0]^T$. The orientation angle $\zeta$ and hence the normalized Stokes vector $S_r$ of the reference eigen mode $S_r$, vary, however, as a function of time t, and are illustrated only in the form of an example in FIG. 3. The Cartesian coordinate system corresponds to the normalized Stokes vectors S1, S2, S3.

According to the present invention, it is advantageous to choose the first and second partial delays $\phi_1$, $\phi_2$ to be equal to linear combinations of Fourier components of a cyclic oscillation at a fundamental frequency f. The inverse 1/f of the fundamental frequency f is then that time period within which the desired polarization scrambling occurs. In order to make it possible to produce the signals for producing the two partial delays $\phi_1$, $\phi_2$ as easily as possible, it is advantageous to use only two Fourier components. The partial delays are then given by the following matrix equation:

$$\begin{bmatrix}\varphi_1\\\varphi_2\end{bmatrix}=R\begin{bmatrix}A_1\cos(2\pi M_1 ft)+A_2\cos(2\pi M_2 ft)\\A_3\sin(2\pi M_1 ft)-A_4\sin(2\pi M_2 ft)\end{bmatrix}$$

where R is, in this case, a 2×2 rotation matrix in the form:

$$R=\begin{bmatrix}\cos\zeta_0 & -\sin\zeta_0\\\sin\zeta_0 & \cos\zeta_0\end{bmatrix},$$

where $\zeta_0$ is the orientation angle offset $\zeta_0$. Furthermore, $A_1$, $A_2$, $A_3$, $A_4$ are first to fourth coefficients. The first and third coefficients $A_1$, $A_3$ have identical mathematical signs. The second and fourth coefficients $A_2$, $A_4$ likewise have identical mathematical signs. $M_1$, $M_2$ are a first integer and a second integer, respectively. Neither of these must be zero, and they also must have no common divisor. Other but equivalent expressions can be found for the first and second partial delays $\phi_1$, $\phi_2$ if the time t is shifted and/or a specific value is used for the orientation angle offset $\zeta_0$, and simple mathematical/trigonometrical conversions are carried out.

In a first exemplary embodiment, the first input polarization Si1 is chosen such that its normalized Stokes vector $S_{i1}$ is at right angles to the eigen mode great circle GC on the Poincaré sphere, which is the locus of the normalized Stokes vector $S_r$ of the reference eigen mode Sr. Since this eigen mode great circle GC is, in this case, the S1-S2 great circle, the first input polarization Si1 is chosen to be right-hand or left-hand circular. This allows a first output polarization So1 in left-hand or right-hand circular form to be produced; that is to say, the orthogonal to the first input polarization Si1, if the delay $\phi$ is equal to $\pi$. With a suitable definition, the phase shift of the left-hand or right-hand circular first output polarization So1 with respect to the right-hand or left-hand circular first input polarization Si1 is the orientation angle $\zeta$.

In order to achieve ideal polarization scrambling with uncorrelated normalized Stokes parameters of the first output polarization So1, the sum magnitude $|M_1+M_2|$ of the first and second integers $M_1$, $M_2$, that is the magnitude of their sum $M_1+M_2$, is chosen to be at least equal to 3 in the first exemplary embodiment. Furthermore, the third and fourth coefficients $A_3$, $A_4$ are chosen to be equal respectively to the first and second coefficients $A_1$, $A_2$, that is to say $A_3=A_1$, $A_4=A_2$. Furthermore, the first coefficient $A_1$ is chosen to be at least approximately equal to $A_1=0.98$ radians, and the second coefficient $A_2$ is chosen to be at least approximately equal to $A_2=1.37$ radians. Smaller discrepancies between the first and second coefficients $A_1$, $A_2$ of these values have a comparatively minor effect on the quality of the polarization scrambling, provided that the sum $A_1+A_2$ of the first and second coefficients $A_1$, $A_2$ remains approximately at the value 2.35 radians. One example of this is the choice of $A_1=A_2=1.12$ radians. In this case, the alternating components of the normalized Stokes parameters of the first output polarization So1 are likewise uncorrelated, but, on average, the first output polarization So1 has a small but not negligible circular component.

A comparatively low highest available frequency max $(|M_1 f|,|M_2 f|)$ is obtained when one of the two integers $M_1$, $M_2$ is chosen to be equal to 2 and the other is chosen to be equal to 1, or when one of the integers $M_1$, $M_2$ is chosen to be equal to −2 and the other is chosen to be equal to −1. The locus curve of the normalized Stokes vector $S_{o1}$ of the first output polarization So1 on the Poincaré sphere is illustrated in FIG. 3 for the situation where $M_1=2$, $M_2=1$, $\zeta_0=0$. The first output polarization So1 has $|M_1+M_2|=$ three-part rotational symmetry with respect to the normalized Stokes vector $S_{i1}$ of the first input polarization Si1; that is to say, in this case the circular axis corresponding to the Stokes parameter S3. The normalized Stokes vector $S_{i1}$ of the first input polarization Si1 was, in this case, chosen to be right-hand circular in accordance with S3=1, S2=S1=0. In many cases, it will be possible to provide horizontal or vertical polarization for the optical signal OS. This can be converted very easily to the desired circular input polarization Si1 via an electrooptical quarter-wave plate with eigen modes that are polarized linearly in the 45° and −45° directions. This quarter-wave plate may be integrated on the same LiNbO$_3$ substrate as the first polarization scrambler Rs1.

FIG. 4 shows the second polarization scrambler Rs2 as the basis for further exemplary embodiments of the present invention.

This is in the form of a second mode converter MC2 as is known from IEEE J. Quantum Electronics, 18 (1982) 4, pages 767–771. The second mode converter MC2 is an electrooptical TE-TM mode converter SBA using LiNbO$_3$ with an X cut and a Y propagation direction. This has a further waveguide WG2, which is produced by titanium diffusion and through which the optical signal OS is passed from the second input Rsi2 to the second output Rso2. Pieces of a first and second electrode E1, E2, respectively, are applied alternately in the form of a comb over the entire length of the further waveguide WG2, whose three-dimensional comb period along the further waveguide WG2 is, in each case, equal to the beat length L between the TE and TM modes. The combs which are associated with a respective electrode E1 or E2 each may be connected to one another on the $LiNbO_3$ crystal, or, as shown, outside the $LiNbO_3$ crystal. The respective mating piece for the combs of the first and second electrodes E1, E2 is a ground electrode E0 in the form of a comb. The combs of the first and second electrodes E1, E2 are shifted with respect to one another along the further waveguide WG2 modulo a TE-TM beat length L by L/4; that is to say, by ¼ of this beat length. Additional separations of L/4 and 3L/4, alternately, therefore are inserted along the further waveguide WG2 between combs of the first electrode E1 and of the second electrode E2. A voltage which is applied just between the first electrode E1 and the ground electrode E0, as the third control signal E1s, produces the first partial delay $\phi_1$. In this case, for example, the reference eigen mode Sr is a linear polarization with an elevation angle of +45° (or −45°), corresponding to an orientation angle of $\zeta=0$. A further voltage, which is applied just between the second electrode E2 and the ground electrode E0, as the fourth control signal E2s, produces the second partial delay $\zeta_2$. In this case, for example, the reference eigen mode Sr is a right-hand (or left-hand) circular polarization, corresponding to an orientation angle of $\zeta=\pi/2$. Any desired delay $\phi$ and any desired reference eigen mode Sr which can be represented on the S2–S2 great circle of the Poincaré sphere can be produced by combining these two cases. In this case, $\phi=\sqrt{\phi_1^2+\phi_2^2}$ and $\zeta=\arg(\phi_1+j\phi_2)$. The orientation angle $\zeta$ may be plotted, as shown in FIG. 5, along the S2–S3 great circle of the Poincaré sphere, for example from the positive S2 axis in the direction of the positive S3 axis, and denotes a point thereof as the locus of the reference eigen mode Sr. The normalized Stokes vector $S_r$ of the reference eigen mode Sr is, in this case, $Sr=[0 \cos \zeta \sin \zeta]^T$.

As in the first exemplary embodiment, the second input polarization Si2 in the second exemplary embodiment is chosen such that its normalized Stokes vector $S_{i2}$ is at right angles to that eigen mode great circle GC on the Poincaré sphere which is the locus of the reference eigen mode Sr. Since this eigen mode great circle GC in the second exemplary embodiment is the S2–S3 great circle, the second input polarization Si2 is chosen as a horizontal or vertical polarization. A vertical or horizontal second output polarization So2 can be produced from this; that is to say, the orthogonal of the second input polarization Si2, provided that the delay $\phi$ is equal to $\pi$. The phase shift between the vertical or horizontal second output polarization So2 and the horizontal or vertical second input polarization Si2 is the orientation angle $\zeta$, which can once again be plotted on the eigen mode great circle GC; that is to say, in this case on the S2–S3 great circle.

The choice of the first and second partial delay $\phi_1$, $\phi_2$ may be made as described further above for the first exemplary embodiment. In contrast to this, first and second numbers $M_1=-2$, $M_2=-3$ were chosen for the illustration of the second exemplary embodiment in FIG. 5. This results, by way of example, in $|M_1+M_2|=5$-part part rotational symmetry about the normalized Stokes vector Si2 of the second input polarization Si2; that is to say, in this case about the S1 axis of the Poincaré sphere. This is shown by the illustration of the locus of the second output polarization So2 on the Poincaré sphere as shown in FIG. 5. A negligible orientation angle offset $\zeta_0=0$ was once again chosen in this case. The normalized Stokes vector $S_{i2}$ of the second input polarization Si2 was, in this case, chosen to be horizontal, in accordance with S1=1, S2=S3=0. The orientation angle $\zeta$ and hence the normalized Stokes vector $S_r$ of the reference eigen mode Sr once again vary as a function of time t, and are shown only in the form of an example in FIG. 5.

Figure 6:
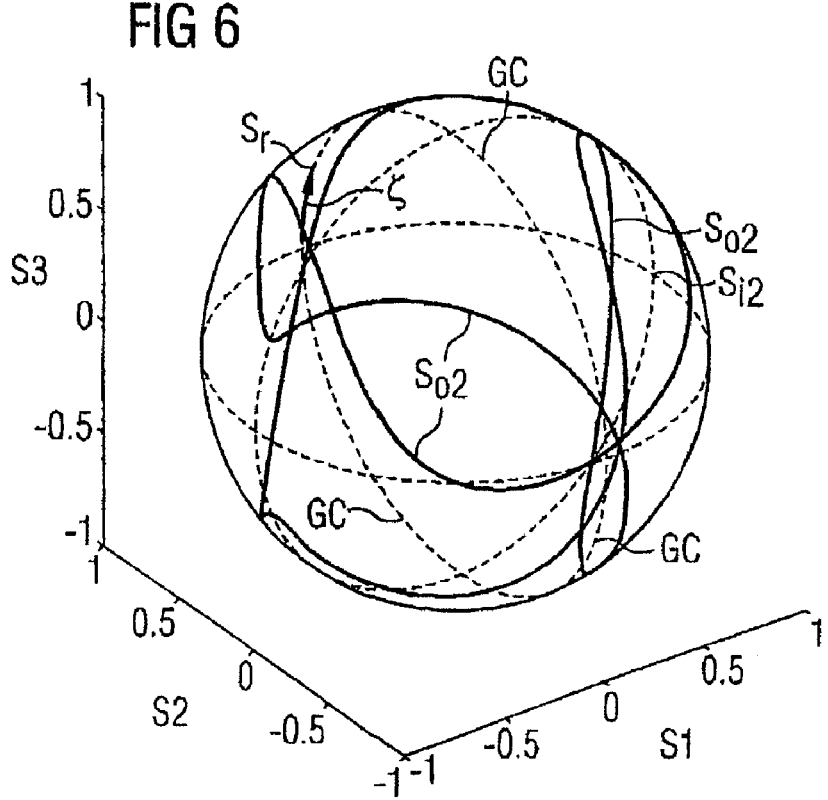
FIG. 6 shows a further locus curve of an output polarization on the Poincaré sphere.

A third exemplary embodiment of the present invention likewise is illustrated by FIG. 4. This differs from the second by having first and second integers $M_1$, $M_2$ which are respectively chosen to be equal to $M_1=-1$ and $M_2=3$ or equal to $M_1=1$ and $M_2=-3$, and first to fourth coefficients $A_1$, $A_2$, $A_3$, $A_4$ which are chosen to be equal to $A_1=1.09$ radians, $A_2=1.653$ radians, $A_3=0.865$ radians, $A_4=1.114$ radians. This situation where $M_1=-1$, $M_2=3$ results in $|M_1+M_2|=2$-part rotational symmetry about the normalized Stokes vector $S_{i2}$ of the second input polarization Si2; that is to say, in this case about the S1 axis of the Poincaré sphere. This is shown by the illustration of the locus of the second output polarization So2 on the Poincaré sphere as shown in FIG. 6. A negligible orientation angle offset $\zeta_0=0$ was once again chosen in this case. The normalized Stokes vector $S_{i2}$ of the second input polarization Si2 was, in this case, chosen to be horizontal, in accordance with S1=1, S2=S3=0. The orientation angle $\zeta$ and hence the normalized Stokes vector $S_r$ of the reference eigen mode Sr once again vary as a function of time t, and are shown only in the form of an example in FIG. 6.

Figure 7:
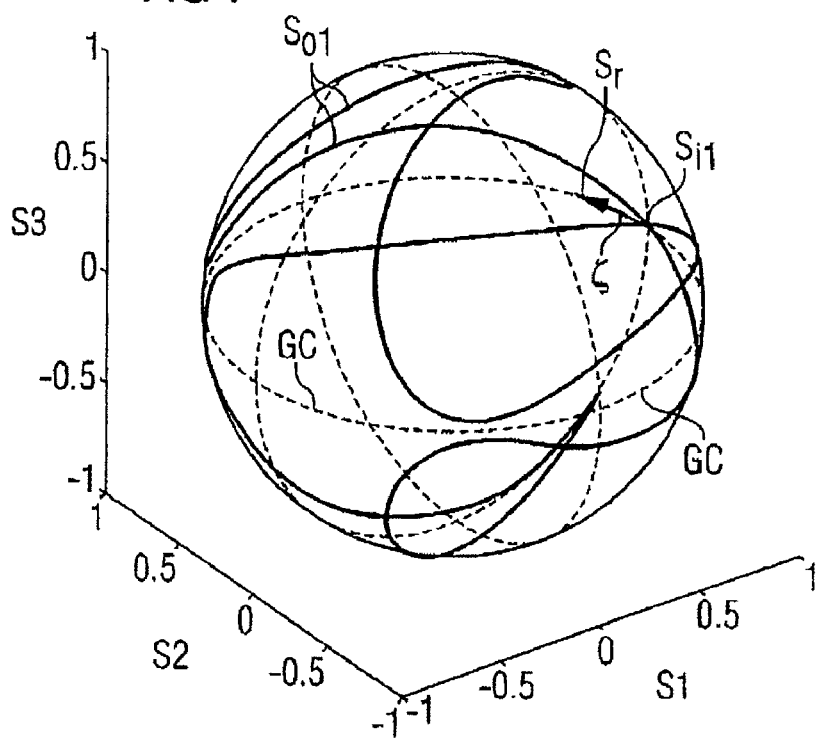
FIG. 7 shows a further locus curve of an output polarization on the Poincaré sphere.

A fourth exemplary embodiment of the present invention is, in turn, illustrated by FIG. 2. In comparison to the first exemplary embodiment, this differs firstly by having first and second integers $M_1$, $M_2$ which are respectively chosen to be equal to $M_1=-1$ and $M_2=3$ or equal to $M_1=1$ and $M_2=-3$, and first to fourth coefficients $A_1$, $A_2$, $A_3$, $A_4$ which are chosen to be equal to $A_1=1.804$ radians, $A_2=0.576$ radians, $A_3=2.258$ radians, $A_4=1.524$ radians. A further difference from the first exemplary embodiment of the present invention is that the normalized Stokes vector $S_{i1}$ of the first input polarization Si1 lies on the eigen mode great circle GC, to be precise at or opposite the point which is identified by the orientation angle offset $\zeta_0$, with the orientation angle offset $\zeta_0$ on the eigen mode great circle GC being plotted from the same point and in the same direction as the orientation angle $\zeta$. In the case of the eigen mode great circle GC on the S1–S2 plane here, the normalized Stokes vector $S_{i1}$ of the first input polarization Si1 is given by $S_{i1}=\pm[\cos \zeta_0 \sin \zeta_0 0]^T$. $\zeta_0=0$ is once again chosen in the following text. For the situation with horizontal first input polarization Si1 corresponding to a normalized Stokes vector $S_{i1}$ where S1=1, S2=S3=0, the orientation angle $\zeta$ and the locus curve of the normalized Stokes vector $S_{o1}$ of the first input polarization So1 are shown in FIG. 7. This locus curve has $|M_1+M_2|=2$-part rotational symmetry about the normalized Stokes vector $S_{i1}$ of the first input polarization Si1; that is to say, in this case about the S1 axis of the Poincaré sphere. In this example, the orientation angle $\zeta$ runs along the S1–S2 great circle, plotted, for example, from the positive S1 axis in the direction of the positive S2 axis.

The first to fourth coefficients $A_1$, $A_2$, $A_3$, $A_4$ of the exemplary embodiments of the present invention described above were optimized on the basis of the respective choice of the first and second integers $M_1$, $M_2$ via a simplex method which is called by the function FMINS in the program packet Matlab. The optimization criterion used in this case was that the eigen values of the correlation matrix $$C = \langle S_{o1} \cdot S_{o1}^T \rangle \text{ or } C = \langle S_{o2} \cdot S_{o2}^T \rangle \qquad 5$$

of the normalized Stokes vector $S_{o1}$, $S_{o2}$ of the output polarization So1, So2 should as far as possible be of equal magnitude, and/or should as far as possible be equal to ⅓. By virtue of the idea of the present invention of using a delay $\phi$ which varies with time and a reference eigen mode Sr which varies with time, this was achieved in all the exemplary embodiments of the present invention described above. Further exemplary embodiments of the present invention easily can be determined in this way. If more than two harmonics of the fundamental frequency f are used in the partial delays $\phi_1$, $\phi_2$ and control signals E1s, ERs, E1s, E2s, this results in additional degrees of freedom.

A fifth exemplary embodiment of the present invention is, in turn, illustrated by FIG. 2. In comparison to the first exemplary embodiment, this has a different first output polarization So1, whose normalized Stokes vector $S_{o1}$ is chosen as follows:

$$S_{o1} = \begin{bmatrix} S_{o11} \\ S_{o12} \\ S_{o13} \end{bmatrix} = \begin{bmatrix} (1 - M_5\sqrt{1/3})/2 \cdot \cos(2\pi(M_3 + M_4)ft) - \\ (1 + M_5\sqrt{1/3})/2 \cdot \sin(2\pi(M_3 - M_4)ft) \\ (1 - M_5\sqrt{1/3})/2 \cdot \sin(2\pi(M_3 + M_4)ft) + \\ (1 + M_5\sqrt{1/3})/2 \cdot \cos(2\pi(M_3 - M_4)ft) \\ \sqrt{2/3} \cdot \sin(2\pi M_3 ft) \end{bmatrix}$$

In this case, $M_3$, $M_4$ and $M_5$ are respectively third, fourth and fifth integers. The fifth integer $M_5$ is chosen to be equal to 1 or equal to −1. The fourth integer $M_4$ is chosen such that it is not equal to zero. The magnitude $|M_3|$ of the third integer $M_3$ is chosen to be greater than the magnitude $|M_4|$ of the fourth integer $M_4$. Possible number pairs are, for example, $M_3=\pm 2$, $M_4=\pm 1$ or $M_3=\pm 3$, $M_4=\pm 1$ or $M_3=\pm 3$, $M_4=\pm 2$. In this case, the mathematical signs of the third to fifth integers $M_3$, $M_4$, $M_5$ each may be chosen to be different from one another.

A first output polarization So1 such as this can, in principle, be produced from any desired first input polarization Si1 via the first polarization scrambler Rs1 as shown in FIG. 2. The first and second partial delays $\phi_1$, $\phi_2$ have particularly low magnitudes, however, if the first input polarization Si1 is chosen to be right-hand circular Si1=[0 0 1]$^T$. The delay $\phi$ is then chosen to be equal to $\phi=\arccos(S_{o13})$, and the orientation angle $\zeta=\arg(\phi_1+j\phi_2)$ is chosen to be equal to $\zeta=\arg(-S_{o12}+jS_{o11})$. Finally, the first and second partial delays, respectively, are $\phi_1=\phi \cos \zeta$, $\phi_2=\phi \sin \zeta$. The required polarization transformations are thus specified completely.

Figure 8:
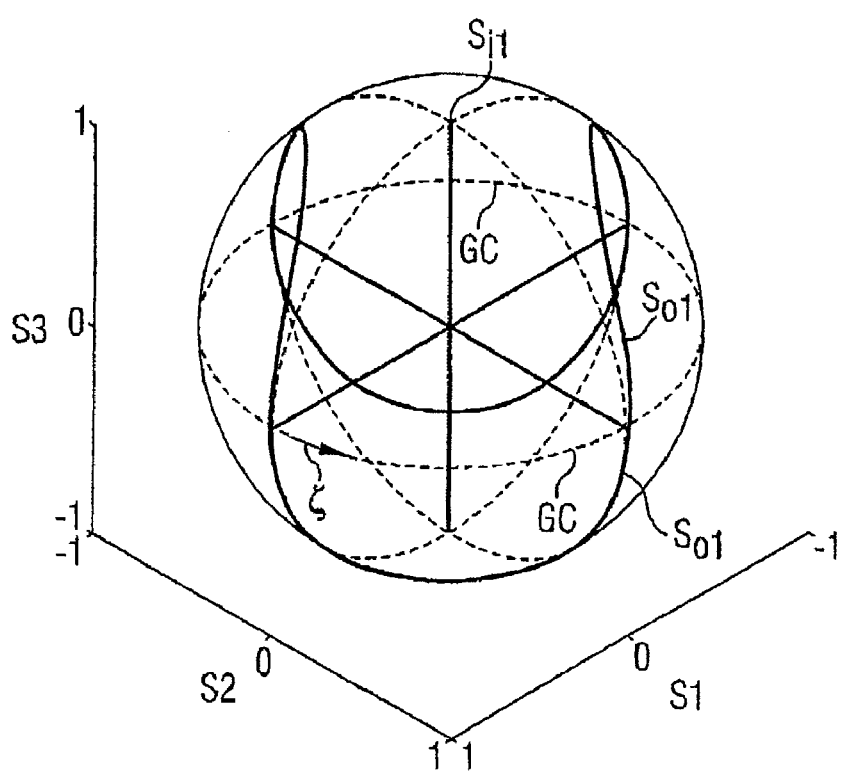
FIG. 8 shows a further locus curve of an output polarization on the Poincaré sphere.

The first input polarization Si1, the first output polarization So1, the eigen mode great circle GC corresponding to the S1–S2 great circle and the orientation angle $\zeta$ are illustrated on the Poincaré sphere for this situation in FIG. 8, to be precise for $M_3=2$, $M_4=1$, $M_5=1$.

A sixth exemplary embodiment of the present invention is, in turn, illustrated by FIG. 2. In comparison to the fifth exemplary embodiment, this has a different first output polarization So1, whose normalized Stokes vector $S_{o1}$ is chosen as follows:

$$S_{o1} = \begin{bmatrix} S_{o11} \\ S_{o12} \\ S_{o13} \end{bmatrix} = \begin{bmatrix} \sqrt{2/3} \cdot \cos(2\pi M_7 ft) \cdot \sin(2\pi M_6 ft) + \sqrt{1/3} \cdot \\ M_8 \cdot \sin(2\pi M_7 ft) \\ \sqrt{2/3} \cdot \sin(2\pi M_7 ft) \cdot \sin(2\pi M_6 ft) - \sqrt{1/3} \cdot \\ M_8 \cdot \cos(2\pi M_7 ft) \\ \sqrt{2/3} \cdot \cos(2\pi M_6 ft) \end{bmatrix}$$

In this case, $M_6$, $M_7$ and $M_8$ are respectively sixth to eighth integers, which are all chosen such that they are not equal to zero. The eighth integer $M_8$ is chosen to be equal to 1 or equal to −1. The magnitude $|M_7|$ of the seventh integer $M_7$ must not be equal to the magnitude $|M_6|$ of the sixth integer $M_6$ and, furthermore, must not be chosen such that it is equal to twice $2|M_6|$ the magnitude $|M_6|$ of the sixth integer $M_6$. Possible numbers are, for example, $M_6=\pm 3$, $M_7=\pm 1$ or $M_6=+1$, $M_7=\pm 3$. In this case, the mathematical signs of the sixth to eighth integers $M_6$, $M_7$, $M_8$ may each be chosen to be different to one another.

A first output polarization So1 such as this can, in principle, be produced from any desired first input polarization Si1 via the first polarization scrambler Rs1 as shown in FIG. 2. The first and second partial delays $\phi_1$, $\phi_2$ have particularly low magnitudes, however, if the first input polarization Si1 is chosen to be right-hand circular Si1=[0 0 1]$^T$. The delay $\phi$ is then chosen to be equal to $\phi=\arccos(S_{o13})$, and the orientation angle $\zeta=\arg(\phi_1+j\phi_2)$ is chosen to be equal to $\zeta=\arg(-S_{o12}+jS_{o11})$. Finally, the first and second partial delays, respectively, are $\phi_1=\phi \cos \zeta$, $\phi_2=\phi \sin \zeta$. The required polarization transformations are thus specified completely.

The first input polarization Si1, the first output polarization So1, the eigen mode great circle GC corresponding to the S1–S2 great circle and the orientation angle $\zeta$ are illustrated on the Poincaré sphere for this situation in FIG. 9, to be precise for $M_6=1$, $M_7=2$, $M_8=1$.

All the described exemplary embodiments of the present invention have the common feature that ideal polarization scrambling is possible even when the normalized Stokes parameters S1, S2, S3 of the Poincaré sphere are rotated with respect to the chosen normalized Stokes vectors $S_{i1}$, $S_{i2}$ of the input polarizations Si1, Si2, the normalized Stokes vector $S_r$ of the reference eigen mode Sr and the resultant normalized Stokes vectors $S_{o1}$, $S_{o2}$ of the output polarization So1, So2 in the same way.

All the exemplary embodiments of the present invention which make use of a Soleil-Babinet compensator SBC can be implemented using the TE-TM mode converter SBA after cyclically interchanging the normalized Stokes parameters S1, S2, S3 to the sequence S3, S1, S2. The cyclic interchanging of the normalized Stokes parameters results in a change in the required input polarization; for example, horizontal/vertical instead of right-hand/left-hand circular. All the exemplary embodiments of the present invention which use the TE-TM mode converter likewise can be implemented using a Soleil-Babinet compensator SBC after cyclically interchanging the normalized Stokes parameters S1, S2, S3 to the sequence S2, S3, S1. The cyclic interchanging of the normalized Stokes parameters results in a change in the required input polarization; for example, right-hand/left-hand circular instead of horizontal/vertical.

Further variations relate to rotations of the plane in which the great circle of the Poincaré sphere lies, on which the reference eigen mode Sr can be varied. As such, it is possible to choose an orientation angle offset $\zeta_0$ which is not equal to zero.

Further variations relate to the replacement of all the polarizations by mutually orthogonal polarizations.

Further variations relate to the replacement of the time t by a shifted time t−t0, where t0 is any variable time offset. The time t thus can be regarded as a time zero point, which can be varied as required, in all the above formulae.

The polarization scrambler Rs1, Rs2 likewise may be followed or preceded by further retarders. These also may be, for example, short pieces of the further waveguide WG2, possibly with a length equivalent to only a fraction of one beat wavelength L, such as those which unavoidably occur to a greater or lesser extent when sawing off an $LiNbO_3$ substrate from which the second mode converter MC2 may be produced.

Although the present invention has been described with reference to specific embodiments, those of skill in the art will recognize that changes may be made thereto without departing from the spirit and scope of the present invention as set forth in the hereafter appended claims.

The invention claimed is:

1. A polarization scrambler, comprising:
   a retarding system, said retarding system producing a reference eigen mode and a second eigen mode, said second eigen mode being delayed with respect to the reference eigen mode;
   an input, coupled to the retarding system, wherein an optical signal passes through the retarding system and is supplied at the input with an input polarization; and
   a correlation matrix for a normalized Stokes vector of an output polarization which is produced by said retarding system, wherein said correlation matrix is at least approximately equal to ⅓ times a 3×3 unit matrix;
   wherein the reference eigen mode and the delay vary as a function of time.

2. A polarization scrambler as claimed in claim 1, further comprising:
   a mode converter, coupled to said retarding system, said mode converter having a variable delay and a variable orientation, wherein a phase difference occurs between converted signals and non-converted signals, with a Stokes vector for the reference eigen mode in each case being located at a point, which is identified by an orientation angle, on an eigen mode great circle on a Poincaré sphere.

3. A polarization scrambler as claimed in claim 2, wherein, if the orientation ($\zeta$) is equal to zero, the mode converter has a first partial delay ($\Phi_1$), if the orientation ($\zeta$) is equal to $\pi/2$, the mode converter has a second partial delay ($\Phi_2$), and the delay is $\phi=\sqrt{\phi_1^2+\phi_2^2}$ and the orientation ($\zeta$) is $\zeta=\arg(\Phi_1+j\Phi_2)$.

4. A polarization scrambler as claimed in claim 3, wherein at least one of the first and second partial delays ($\Phi_1$, $\Phi_2$) is chosen to be equal to a linear combination of Fourier components of a cyclic oscillation at a fundamental frequency (f).

5. A polarization scrambler as claimed in claim 4, wherein the first and second partial delays ($\Phi_1$, $\Phi_2$) are chosen at least approximately in accordance with the matrix equation $$\begin{bmatrix} \varphi_1 \\ \varphi_2 \end{bmatrix} = R \begin{bmatrix} A_1\cos(2\pi M_1 ft) + A_2\cos(2\pi M_2 ft) \\ A_3\sin(2\pi M_1 ft) - A_4\sin(2\pi M_2 ft) \end{bmatrix}$$

where R is a 2×2 rotation matrix in the form $$R = \begin{bmatrix} \cos\zeta_0 & -\sin\zeta_0 \\ \sin\zeta_0 & \cos\zeta_0 \end{bmatrix}$$

and $\zeta_0$ is an orientation angle offset $\zeta_0$, $M_1$, $M_2$ are first and second integers ($M_1$, $M_2$) which are not zero and have no common divisor, and $A_1$, $A_2$, $A_3$, $A_4$ are respectively first to fourth coefficients ($A_1$, $A_2$, $A_3$, $A_4$), of which the first and third coefficients ($A_1$, $A_3$) have identical mathematical signs, and the second and fourth coefficients ($A_2$, $A_4$) have identical mathematical signs.

6. A polarization scrambler as claimed in claim 5, wherein the normalized Stokes vector of the input polarization is at right angles to the eigen mode great circle.

7. A polarization scrambler as claimed in claim 6, wherein the first and third coefficients ($A_1$, $A_3$) are at least approximately equal to $A_1=A_3=0.98$ radians, and the second and fourth coefficients ($A_2$, $A_4$) are at least approximately equal to $A_2=A_4=0.37$ radians, in that a sum magnitude ($|M_1+M_2|$) of the first and second integers ($M_1$, $M_2$) is greater than or equal to 3.

8. A polarization scrambler as claimed in claim 7, wherein one of the integers ($M_1$, $M_2$) is equal to ±2, the other of the integers ($M_1$, $M_2$) is equal to ±1, and the first and second integers ($M_1$, $M_2$) have the same mathematical signs.

9. A polarization scrambler as claimed in claim 6, wherein the first to the fourth coefficients ($A_1$, $A_2$, $A_3$, $A_4$) are at least approximately respectively equal to $A_1=1.09$ radians, $A_2=1.653$ radians, $A_3=0.865$ radians, $A_4=1.114$ radians, and the first and second integers ($M_1$, $M_2$) are equal to $M_1=-1$ and $M_2=3$, respectively, or $M_1=1$ and $M_2=-3$, respectively.

10. A polarization scrambler as claimed in claim 5, wherein the normalized Stokes vector of the input polarization in a plane of the eigen mode great circle is located at a point which is identified by the orientation angle offset $\zeta_0$ or is located opposite such a point, the first to fourth coefficients ($A_1$, $A_2$, $A_3$, $A_4$) are at least approximately equal to $A_1=1.804$ radians, $A_2=0.576$ raidans, $A_3=2.258$ radians, $A_4=1.524$ radians, and the first and second integers ($M_1$, $M_2$) have magnitudes equal to 1 and 3, respectively, and have different mathematical signs.

11. A polarization scrambler as claimed in claim 4, wherein the normalized Stokes vector ($S_{o1}$) of the first output polarization is chosen in any desired Cartesian coordinate system in accordance with $$s_{ol} = \begin{bmatrix} (1-M_5\sqrt{1/3})/2 \cdot \cos(2\pi(M_3+M_4)ft) - \\ (1+M_5\sqrt{1/3})/2 \cdot \sin(2\pi(M_3-M_4)ft) \\ (1-M_5\sqrt{1/3})/2 \cdot \sin(2\pi(M_3+M_4)ft) + \\ (1+M_5\sqrt{1/3})/2 \cdot \cos(2\pi(M_3-M_4)ft) \\ \sqrt{2/3} \cdot \sin(2\pi M_3 ft) \end{bmatrix}$$

where $M_3$, $M_4$, $M_5$ are respectively third, fourth and fifth integers ($M_3$, $M_4$, $M_5$), with the fifth integer ($M_5$) being chosen such that its magnitude is equal to 1, with the fourth integer ($M_4$) being chosen so that it is not equal to zero, with the magnitude ($|M_3|$) of the third integer ($M_3$) being chosen to be greater than the magnitude ($|M_4|$) of the fourth integer ($M_4$), and in which case the mathematical signs of the third to fifth integers ($M_3$, $M_4$, $M_5$) may each be chosen to be different to one another.

12. A polarization scrambler as claimed in claim 11, wherein the normalized Stokes vector of the first input polarization in the chosen Cartesian coordinate system is at right angles to the S1-S2 great circle of the Stokes vector ($S_{o1}$) of the first output polarization.

13. A polarization scrambler as claimed in claim 12, wherein the delay ($\Phi$) is chosen to be equal to $\Phi$=arcos ($S_{o13}$), and the orientation angle $\zeta$=arg ($\Phi1+j\Phi2$) is chosen to be equal to $\zeta$=arg ($-So12-jSo11$), which results in first and second partial delays ($\Phi_1$, $\Phi_2$) such that $\Phi_1=\Phi \cos \zeta$, $\Phi_2=\Phi \sin\zeta$, respectively.

14. A polarization scrambler as claimed in claim 2, wherein the mode converter comprises a Soleil-Babinet compensator with mode conversion between right-hand and left-hand circular modes, in that the eigen mode great circle of the S1-S2 great circle is the Poincaré sphere.

15. A polarization scrambler as claimed in claim 14, wherein the Soleil-Babinet compensator comprises an electooptical wave plate using $LiNbO_3$, with an X cut, and at least approximately with a Z propagation direction.

16. A polarization scrambler as claimed in claim 2, wherein the mode converter comprises a TE-TM mode converter with mode conversion between the TE and TM modes, in that the eigen mode great circle of the S2–S3 great circle is the Poincaré sphere.

17. A polarization scrambler as claimed in claim 16, wherein the TE-TM mode converter is an electrooptical mode converter using $LiNbO3$ with an X cut and a Y propagation direction.

18. A method for polarization scrambling via a polarization scrambler that includes a retarding system, the method comprising the steps of:
providing the polarization scrambler with a reference eigen mode via said retarding system;
providing the polarization scrambler with a second eigen mode via said retarding system, wherein said second eigen mode is delayed with respect to the reference eigen mode;
passing an optical signal through the retarding system, said optical signal being supplied at an input with an input polarization;
producing a correlation matrix in said retarding system for a normalized Stokes vector of an output polarization of said optical signal that is at least approximately equal to ⅓ times a 3×3 unit matrix; and
varying the reference eigen mode and the delay as a function of time.

19. method for polarization scrambling as claimed in claim 18, wherein method for polarization scrambling a mode conversion is carried out with a variable delay ($\Phi$) and a variable orientation ($\zeta$), such that a phase difference occurs between the converted signals and non-converted signals, with a Stokes vector for the reference eigen mode in each case being located at a point, which is identified by an orientation angle on an eigen mode great circle (GC) on a Poincaré sphere.

20. A method for polarization scrambling as claimed in claim 19, wherein, if the orientation ($\zeta$) is equal to 0, a first partial delay ($\Phi_1$) occurs, if the orientation ($\zeta$) is equal to $\pi/2$, a second partial delay ($\Phi_2$) occurs, and the delay is $\phi=\sqrt{\phi_1^2+\phi_2^2}$ and the orientation ($\zeta$) is $\zeta$=arg($\Phi_1+j\Phi_2$).

21. A method for polarization scrambling as claimed in claim 20, wherein at least one of the first and second partial delays ($\Phi_1$, $\Phi_2$) is chosen to be equal to a linear combination of Fourier components of a cyclic oscillation at a fundamental frequency (f).

22. A method for polarization scrambling as claimed in claim 21, wherein the first and second partial delays ($\Phi_1$, $\Phi_2$) are chosen at least approximately in accordance with the matrix equation $$\begin{bmatrix} \varphi_1 \\ \varphi_2 \end{bmatrix} = R \begin{bmatrix} A_1\cos(2\pi M_1 ft) + A_2\cos(2\pi M_2 ft) \\ A_3\sin(2\pi M_1 ft) - A_4\sin(2\pi M_2 ft) \end{bmatrix}$$

where R is a 2×2 rotation matrix in the form $$R = \begin{bmatrix} \cos\zeta_0 & -\sin\zeta_0 \\ \sin\zeta_0 & \cos\zeta_0 \end{bmatrix}$$

and $\zeta_0$ is an orientation angle offset $\zeta_0$, $M_1$, $M_2$ are first and second integers ($M_1$, $M_2$) which are not zero and have no common divisor, and $A_1$, $A_2$, $A_3$, $A_4$ are respectively first to fourth coefficients ($A_1$, $A_2$, $A_3$, $A_4$), of which the first and third coefficients ($A_1$, $A_3$) have identical mathematical signs, and the second and fourth coefficients ($A_2$, $A_4$) have identical mathematical signs.

23. A method for polarization scrambling as claimed in claim 22, wherein the normalized Stokes vector of the input polarization is at right angles to the eigen mode great circle.

24. A method for polarization scrambling as claimed in claim 23, wherein the first and third coefficients ($A_1$, $A_3$) are at least approximately equal to $A_1=A_3=0.98$ radians, and the second and fourth coefficients ($A_2$, $A_4$) are at least approximately equal to $A_2=A_4=1.37$ radians, in that the sum magnitude ($|M_1+M_2|$) of the first and second integers ($M_1$, $M_2$) is greater than or equal to 3.

25. A method for polarization scrambling as claimed in claim 24, wherein one of the integers ($M_1$, $M_2$) is equal to ±2, the other ($M_2$, $M_1$) of the integers ($M_1$, $M_2$) is equal to ±1, and the first and second integers ($M_1$, $M_2$) have the same mathematical signs.

26. A method for polarization scrambling as claimed in claim 23, wherein the first to the fourth coefficients ($A_1$, $A_2$, $A_3$, $A_4$) are at least approximately respectively equal to $A_1=1.09$ radians, $A_2=1.653$ radians, $A_3=0.865$ radians, $A_4=1.114$ radians, and the first and second integers ($M_1$, $M_2$) are equal to $M_1=-1$ and $M_2=3$, respectively, or $M_1=1$ and $M_2=-3$, respectively.

27. A method for polarization scrambling as claimed in claim 22, wherein the normalized Stokes vector of the input polarization in a plane of the eigen mode great circle is located at a point which is identified by the orientation angle offset $\zeta_0$ or is located opposite such a point, the first to fourth coefficients ($A_1$, $A_2$, $A_3$, $A_4$) are at least approximately equal to $A_1=1.804$ radians, $A_2=0.576$ raidans, $A_3=2.258$ radians, $A_4=1.524$ radians, and the first and second integers ($M_1$, $M_2$) have magnitudes equal to 1 and 3, respectively, and have different mathematical signs.

28. A method for polarization scrambling as claimed in claim 21, wherein the normalized Stokes vector ($S_{o1}$) of the first output polarization is chosen in any desired Cartesian coordinate system in accordance with $$s_{ol} = \begin{bmatrix} (1 - M_5\sqrt{1/3})/2 \cdot \cos(2\pi(M_3 + M_4)ft) - \\ (1 + M_5\sqrt{1/3})/2 \cdot \sin(2\pi(M_3 - M_4)ft) \\ (1 - M_5\sqrt{1/3})/2 \cdot \sin(2\pi(M_3 + M_4)ft) + \\ (1 + M_5\sqrt{1/3})/2 \cdot \cos(2\pi(M_3 - M_4)ft) \\ \sqrt{2/3} \cdot \sin(2\pi M_3 ft) \end{bmatrix}$$

where $M_3$, $M_4$, $M_5$ are respectively third, fourth and fifth integers ($M_3$, $M_4$, $M_5$), with the fifth integer ($M_5$) being chosen such that its magnitude is equal to 1, with the fourth integer ($M_4$) being chosen so that it is not equal to zero, with the magnitude ($|M_3|$) of the third integer ($M_3$) being chosen to be greater than the magnitude ($|M_4|$) of the fourth integer ($M_4$), and in which case the mathematical signs of the third to fifth integers ($M_3$, $M_4$, $M_5$) may each be chosen to be different to one another.

29. A method for polarization scrambling as claimed in claim 28, wherein the normalized Stokes vector of the first input polarization in the chosen Cartesian coordinate system is at right angles to the S1–S2 great circle of the Stokes vector ($S_{o1}$) of the first output polarization.

30. A method for polarization scrambling as claimed in claim 29, wherein the delay ($\Phi$) is chosen to be equal to $\Phi = \arccos(S_{o13})$, and the orientation angle $\zeta = \arg(\Phi 1 + j\Phi 2)$ is chosen to be equal to $\zeta = \arg(-S_{o12} + jS_{o11})$, which results in first and second partial delays ($\Phi_1$, $\Phi_2$) such that $\Phi_1 = \Phi \cos\zeta$, $\Phi_2 = \Phi \sin\zeta$, respectively.

* * * * *